United States Patent
Åström et al.

(10) Patent No.: US 10,128,933 B2
(45) Date of Patent: Nov. 13, 2018

(54) REDUCING LATENCY IN A MESH NETWORK

(71) Applicant: Telefonaktiebolaget L M Ericsson (publ), Stockholm (SE)

(72) Inventors: Magnus Åström, Lund (SE); Rocco Di Taranto, Lund (SE); Dzevdan Kapetanovic, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 95 days.

(21) Appl. No.: 14/762,885

(22) PCT Filed: Jun. 17, 2015

(86) PCT No.: PCT/EP2015/063591
§ 371 (c)(1),
(2) Date: Jul. 23, 2015

(87) PCT Pub. No.: WO2016/202380
PCT Pub. Date: Dec. 22, 2016

(65) Prior Publication Data
US 2017/0195034 A1     Jul. 6, 2017

(51) Int. Cl.
*H04B 7/14*     (2006.01)
*H04L 29/06*    (2006.01)
*H04L 12/741*   (2013.01)
*H04W 24/02*    (2009.01)

(52) U.S. Cl.
CPC ............ *H04B 7/14* (2013.01); *H04L 45/74* (2013.01); *H04L 69/22* (2013.01); *H04W 24/02* (2013.01)

(58) Field of Classification Search
CPC combination set(s) only.
See application file for complete search history.

(56) References Cited

U.S. PATENT DOCUMENTS

| | | |
|---|---|---|
| 5,646,936 A | 7/1997 | Shah et al. |
| 2003/0202468 A1 | 10/2003 | Cain et al. |
| 2003/0204625 A1 | 10/2003 | Cain |
| 2005/0036486 A1 | 2/2005 | Sahinoglu et al. |
| 2007/0070959 A1 | 3/2007 | Almeroth et al. |
| 2007/0121521 A1 | 5/2007 | D'Amico et al. |
| 2008/0039101 A1 | 2/2008 | Callaway |

(Continued)

FOREIGN PATENT DOCUMENTS

| | | |
|---|---|---|
| EP | 2362708 A1 | 8/2011 |
| GB | 2411549 A | 8/2005 |

(Continued)

OTHER PUBLICATIONS

Singh, M., et al., "Cluster-Based Routing Scheme for Wireless Mesh Networks", 13th International Conference on Advanced Communication Technology (ICACT), Feb. 13, 2011, pp. 335-338, IEEE.

*Primary Examiner* — Yee Lam
(74) *Attorney, Agent, or Firm* — Coats & Bennett, PLLC

(57) ABSTRACT

A message (300) that has been transmitted in a mesh network from a source node (102) and intended for reception by a destination node (104) is received by a relay node (125) and also received by a number of other nodes (121, 123). A minimized latency can be obtained by the use of a timer such that the message is relayed by the relay node (125) only if no other node has already relayed the message.

15 Claims, 4 Drawing Sheets

(56) References Cited

U.S. PATENT DOCUMENTS

| | | | |
|---|---|---|---|
| 2008/0247355 A1* | 10/2008 | Ahn | H04L 45/18 370/328 |
| 2008/0310340 A1* | 12/2008 | Isozu | H04L 45/10 370/328 |
| 2008/0317047 A1 | 12/2008 | Zeng et al. | |
| 2009/0228575 A1 | 9/2009 | Thubert et al. | |
| 2010/0091770 A1* | 4/2010 | Ishikawa | H04L 47/20 370/389 |
| 2011/0128918 A1 | 6/2011 | Zhai | |
| 2014/0204728 A1 | 7/2014 | Kobayashi et al. | |
| 2015/0085738 A1* | 3/2015 | Kim | H04W 40/14 370/315 |
| 2016/0094444 A1* | 3/2016 | MeLampy | H04L 45/38 370/392 |

FOREIGN PATENT DOCUMENTS

| | | |
|---|---|---|
| WO | 2010013154 A1 | 2/2010 |
| WO | 2016202381 A1 | 12/2016 |

* cited by examiner

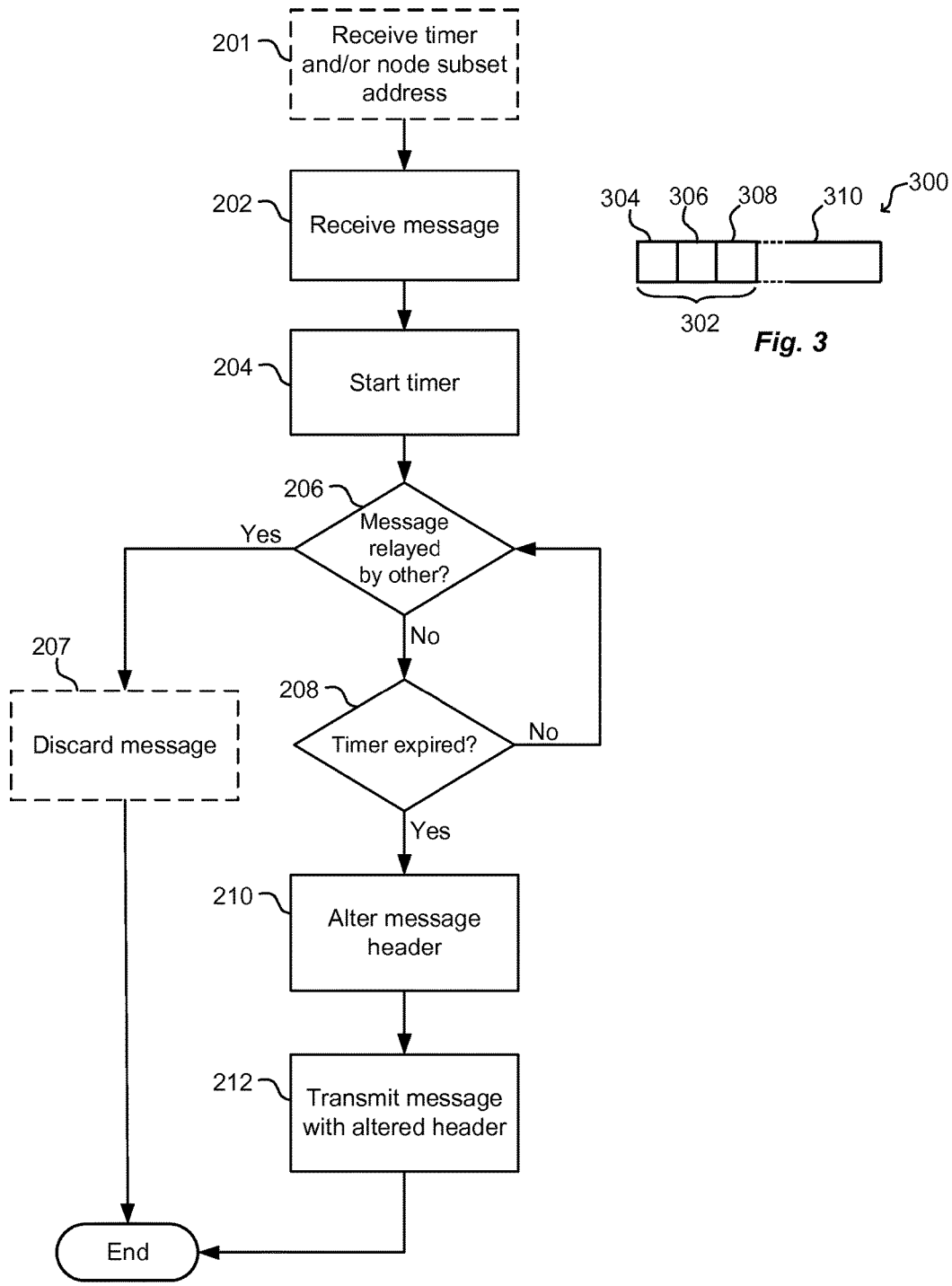

REDUCING LATENCY IN A MESH NETWORK

TECHNICAL FIELD

Embodiments herein relate to a method in a relay node in a wireless communication network for handling relay of a message between a source node and a destination node.

BACKGROUND

Wireless communication systems that provide communication services to wireless communication devices have evolved during the last decade to meet the ever increasing demand for capabilities related to high speed data transfer and to provide these capabilities at any given time and at any geographical location. In order to provide the services at any time and place, the wireless networks typically comprise one or more network nodes, such as radio base stations, that maintain one or more radio cells and the wireless communication devices communicate via these network nodes.

However, in some scenarios wireless networks suffer from the problems of having a limited range and unreliable communications such that data is sometimes received corrupted at the receiver end. As a means to mitigate such range limitations, so-called mesh networks have been developed in which intermediary relay nodes relay data from a source node to a destination node and hence extends the range of the nodes in the mesh network. In other words, in a mesh network wireless communication devices may operate as relay nodes and communicate directly with each other without involvement from a radio base station.

Connectivity of a mesh network describes the ratio with which network nodes can reach another node in the mesh network. In the case of a fully connected mesh network all nodes are able to reach all other nodes. Often, for example in machine type communication, MTC, involving sensors or meters, communication in the mesh network is performed towards a single recipient which is a server receiving sensor or metering data. As a consequence, the only relevant connection on an applications level for a node in such a mesh network is with the server receiving its data. In this case the network is fully connected if all nodes can communicate with the server. For such a mesh network, a proactive routing technique, in which paths are maintained by periodic signaling, is highly suitable since only one route needs to be maintained for all nodes. Hence, if a node is able to find another node connected to the server it may itself connect to the server through that node. Alternatively, for more arbitrarily chosen destination nodes, a reactive network may be more suitable. In such a case a path is set up when a communication need arises, and the link dies sometime after the communication has ceased.

Path setup in a mesh network is well known in the art. For example, in the Institute of Electrical and Electronics Engineers, IEEE, standard 802.11™-2012, a source node broadcasts a Path Request, PREQ, in order to establish a route from itself to a destination node. The PREQ is relayed by all nodes receiving it correctly until it reaches the destination node. Upon receiving the PREQ, the destination node answers with a unicast Path Reply, PREP, to its closest relay node. The PREP is then forwarded along the relay nodes until it reaches the source node and the path is established. The source node then transmits data to the first node in a list of relay nodes that defines the path. The header of a data message typically contains four address fields: a source address and a destination address representing the end points in the path and also a transmitter address and a receiver address, representing end points of a present link between two nodes in the path.

Irrespective of whether the mesh network is reactive or proactive, a path is set up between the source and destination nodes within the mesh network. In order for a message to be forwarded from a source node to destination node, the message only needs to contain information about its final destination. From that information the node is able to look up the node next in line, i.e., which node to relay the message to for it to eventually reach the destination.

Paths in mesh networks are often set up in order to minimize a path metric, e.g. Airtime Link Metric, ATLM, in order to establish an optimal path. Such a metric often takes into account the use of sparse radio resources but not the processing time required for each node to forward a message or, in a worst case, to ask for a retransmission of a message. Neither does such a metric consider the dynamics of wireless communications which are very volatile such that only a small change in the environment may cause a large difference in channel characteristics. What at one time is the best path according to some metric may not be best at another time. For example, a relay node that is unable to receive a message at one point in time may be able to receive a message at another point in time due to the fact that mesh networks may be dynamic in the sense that individual nodes may move within a mesh network. A node that for some reason falls outside its mesh network is detached and hence unable to communicate. In other words, prior art message relay is often burdened with unnecessarily high latency.

SUMMARY

In view of the above, an object of the present disclosure is to overcome or at least mitigate at least some of the drawbacks related to prior art message relay in a mesh network.

This is achieved in one aspect by a method in a relay node in a mesh network for handling relay of messages between a source node and a destination node. The mesh network comprises a plurality of other nodes. The method comprises receiving a message that comprises a header. The header comprises an address of the destination node and an address representing a node subset comprising the relay node and at least one other node. A timer is started and while the timer is running it is determined whether any other node in the node subset transmits the message. If it is determined that none of the other nodes in the node subset transmits the message, then at least a part of the message header of the message is altered and the message is transmitted.

In other words, a message that has been transmitted from the source node and intended for reception by the destination node, is received by the relay node and also received by a number of other nodes, i.e. the node subset. A minimized latency can be obtained by the use of the timer such that the message is relayed by the relay node only if no other node in the node subset has already relayed the message.

The timer defines a waiting time, the length of which may be such that it is different from the waiting time of the other nodes in the node subset. By giving precedence to relay nodes with shorter waiting time, the present disclosure enables minimization of message latency in a mesh network for given channel conditions.

In some embodiments, the determination whether any other node in the node subset transmits the message may comprise determining whether any other node in the node subset transmits the message having an altered header. In some of these embodiments, the header may comprise an address of a transmitting node. In such embodiments, the determination whether any other node in the node subset transmits the message having an altered header may comprise determining whether the address of the transmitting node is altered.

In some embodiments, the header may comprise an address of a transmitting node. In such embodiments, the altering of at least a part of the message header may comprise altering the address of the transmitting node in the header to an address of the relay node itself.

In some embodiments, prior to the reception of the message, information is received that represents the timer value, for example in a PREP message.

In some embodiments, prior to the reception of the message, information is received that represents the address representing the node subset, for example in a PREP message.

In another aspect, there is provided a relay node for use in a mesh network for handling relay of messages between a source node and a destination node. The mesh network comprises a plurality of other nodes. The relay node comprises radio frequency control circuitry, a processor and a memory. The memory contains instructions executable by the processor whereby the relay node is operative to receive a message that comprises a header. The header comprises an address of the destination node and an address representing a node subset comprising the relay node and at least one other node. The relay node is operative to start a timer and while the timer is running determine whether any other node in the node subset transmits the message. The relay node is operative such that, if it is determined that none of the other nodes in the node subset transmits the message, then at least a part of the message header of the message is altered and the message is transmitted.

In another aspect there is provided a computer program comprising instructions which, carry out the method according to the aspect summarized above.

In another aspect there is provided a carrier comprising a computer program according to the summarized aspect above, wherein the carrier is one of an electronic signal, an optical signal, a radio signal and a computer readable storage medium.

These other aspects provide the same effects and advantages as the method aspect summarized above.

BRIEF DESCRIPTION OF THE DRAWINGS

FIG. 2 is a flowchart of a method in a relay node,

FIG. 3 schematically illustrates a message,

DETAILED DESCRIPTION

Figure 1A:
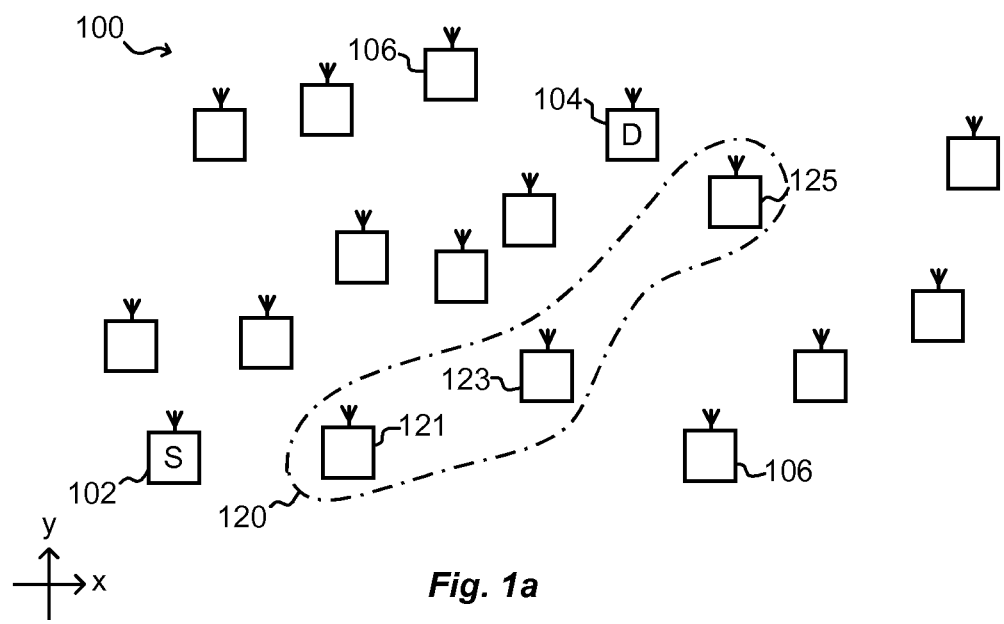
FIGS. 1a and 1b schematically illustrate nodes in a mesh network.

FIG. 1a shows a mesh network 100 that comprises a number of nodes. A source node 102, a destination node 104 and a plurality of nodes, some of which are denoted with reference numerals 106, 121, 123, 125. As the skilled person will appreciate, all nodes may be of one type or of different types of wireless communication devices and the nodes may be configured to operate, e.g. communicate with each other, according to a standard such as IEEE 802 Mesh and also operate to realize the embodiments that will be described in the following. Path setup in IEEE 802.11 Mesh is essentially based on two parameters: the path selection method and the path metric, where the compulsory parameters are the hybrid wireless mesh protocol, HWMP, path selection method and ATLM path metric.

Figure 1B:
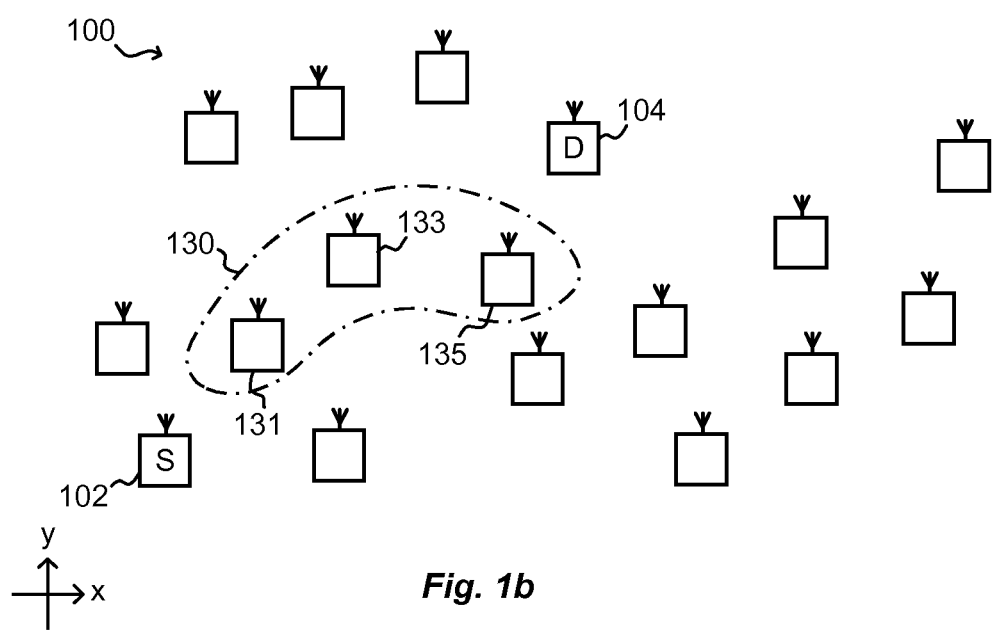

As will be exemplified in some detail below, relaying of messages between the source node 102 and the destination node 104 may involve several of the nodes in the mesh network 100. However, it is to be noted that such relaying may in some instances involve one subset of nodes and in other instances involve another subset of nodes. The actual subset, or subsets, of nodes involved in the relaying will depend on the path that has been set up between the source 102 and the destination 104. The setup of such a path having one or more subsets, or clusters, of nodes is outside the scope of the present disclosure. Nevertheless, in order to illustrate that relaying of messages may be realized using different subsets or clusters of nodes, FIG. 1a illustrates a subset of nodes, node subset 120, comprising nodes 121, 123 and 125 and FIG. 1b illustrates a node subset 130 comprising nodes 131, 133 and 135. For example, the situations illustrated in FIGS. 1a and 1b may correspond to a respective radio environment where varying channel characteristics have resulted in a respective path setup of different subsets of nodes.

Figure 4:
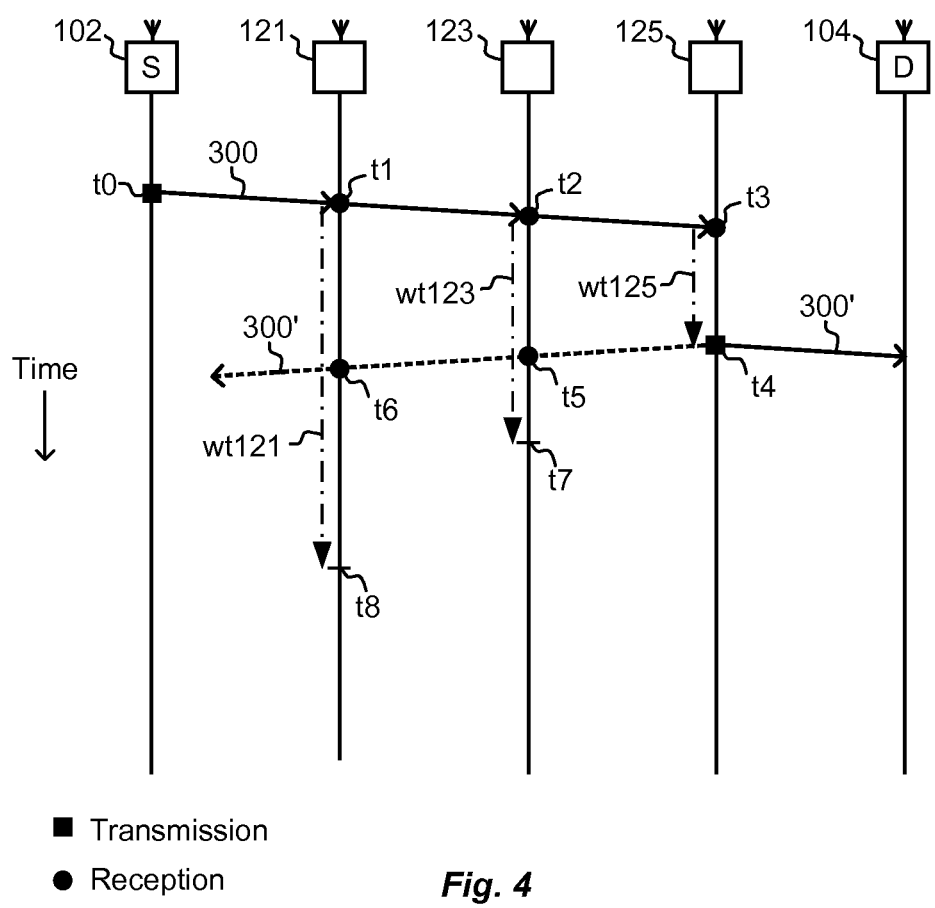
FIG. 4 is a signaling diagram.

Turning now to FIGS. 2-4, and with continued reference to FIG. 1a, embodiments of a method in a relay node in the mesh network 100 for handling relay of messages between the source node 102 and the destination node will be described in terms of a number of actions. As will be illustrated below in connection with embodiments of a relay node and a computer program, the actions of the method in FIG. 2 may be realized by way of software executed by a processor in the relay node.

For the purpose of the description of the present embodiment, the node that is denoted "the relay node" may be any of the nodes 121, 123 and 125. However, as mentioned above, it shall be remembered that "relay node" is to be interpreted as a functional role that any of the nodes in the mesh network 100 may take, depending on how a path between the source and destination nodes has been setup prior to the execution of the message relaying method of FIGS. 2-4.

As illustrated in FIG. 2, the method performed by the relay node 121, 123, 125 may comprise an optional action 201 where the relay node 121, 123, 125 receives information prior to the actions that are involved in the handling of message relay. Action 201 will be described in more detail below.

Action 202

The relay node 121, 123, 125 receives a message 300 that comprises a header 302 that comprises an address 304 of the destination node 104 and an address 306 representing the node subset 120 comprising the relay node 121, 123, 125 and at least one other node. The header may also comprise an address of the transmitting node, which will be discussed in more detail below.

As illustrated in FIG. 3, the message 300 may also comprise a data field 310 of any size. The data field 310 may in some examples have a zero or close to zero size, such as in case the message 300 is an acknowledge, ACK, or a negative acknowledge, NACK, message.

Action 204

The relay node 121, 123, 125 starts a timer. The value of the timer is known to the relay node and, as will be exemplified below, the timer value may be obtained prior to action 202 by reception of information containing the timer value.

Action 206 and Action 208

While the timer is running, a determination is made by the relay node 121, 123, 125 whether any other node in the node subset 120 transmits the message 300. In other words, the timer defines a waiting time during which the relay node 121, 123, 125 listens to transmissions, i.e. receives and analyses messages transmitted by other nodes in the mesh network 100, and determines if the message 300 is transmitted.

In some embodiments, the determination whether any other node in the node subset 120 transmits the message 300 may comprise determining whether any other node in the node subset 120 transmits the message having an altered header 302. An altered header 302 may, for example be an altered address 308 of a transmitting node. In other words, the relay node 121, 123, 125 may receive a message while the timer is running and by analysing it in relation to the header of the message 300 received in action 202, the relay node 121, 123, 125 can determine whether the message received during the waiting time is the message 300 having been altered by the transmitting node.

Action 210

If, in the execution of actions 206 and 208, it is determined that none of the other nodes in the node subset 120 transmits the message 300, then the relay node 121, 123, 125 alters at least a part of the message header 302 of the message 300.

In some embodiments, where the header of the received message 300 comprises an address 308 of a transmitting node, the action 210 of altering of at least a part of the message header may comprise altering the address 308 of the transmitting node in the header 302 to an address of the relay node 121, 123, 125 itself.

Action 212

Having made an alteration in the header of the received message 300, the relay node 121, 123, 125 transmits the message 300. The transmission of the message 300

Action 207

If, in the execution of actions 206 and 208, it is determined that one of the other nodes in the node subset 120 transmits the message, then the relay node 121, 123, 125 may, optionally, discard the message 300, whereupon the method ends.

As mentioned above, action 201 may in some embodiments precede the actions 202-212 described above. In such embodiments, action 201 may comprise receiving information that represents the timer value. Action 201 may also, or alternatively, comprise receiving information that represents the address 306 representing the node subset 120. As discussed above this address 306 may be considered as an address of a cluster of nodes, i.e. the node subset 120 may be considered a cluster of nodes.

In some of these embodiments, the reception of any of the information that represents the timer value and the information that represents the node subset 120 may be realized by way of reception in a path reply, PREP, message. As the skilled person will realize, a PREP message is received during setup of a path between the source node 102 and the destination node 104, prior to message handling as discussed in the present disclosure.

FIG. 4 illustrates, in a signalling diagram, how the message 300 (illustrated in FIG. 4 by diagonal arrows) may be relayed from the source node 102 to the destination node 104 as a consequence of the actions described above. At time t0, the source node 102 transmits the message 300 having the receiver address 306 that represents the node subset 120 comprising nodes 121, 123, 125. In FIG. 4, the perspective is that the node 125 takes the role of "the relay node" that actually relays the message 300 and the nodes 121 and 123 take roles as the other nodes in the node subset 120.

As FIG. 4 shows, the message is received in turn by node 121 at time t1, by the node 123 at time t2 and by the relay node 125 at time t3. The message 300 is handled by each of the nodes 121, 123 and 125 in the way described above and the handling commences in the respective nodes 121, 123, 125 at respective times t1, t2 and t3.

As mentioned above, the waiting time used by the timer in the relay node 125 has a length that is different from a waiting time used by the timer in the other nodes in the mesh network 100. Specifically, with regard to the situation illustrated in FIG. 4, the waiting time used in node 121 and the waiting time used in node 123, are both different than the waiting time used in the relay node 125. More specifically, as FIG. 4 illustrates, the waiting time used in node 121 is wt121, the waiting time used in node 123 is wt123 and the waiting time used in node 125 is wt125. The relationship between wt121, wt123 and wt125 is such that wt121>wt123>wt125. In other words, wt125 is the shortest waiting time among the nodes 121, 123, 125 that have received the message 300.

As mentioned above, the waiting time in respective node may be associated with a respective spatial distance from the node to the destination node. Also, the waiting time in respective node may be associated with a respective processing delay in respective node, as well as a link latency associated with respective node. The waiting time in respective node 121, 123, 125 may also be, partly, dependent on a propagation delay for the message 300, i.e. the time of flight for the message from a transmitting node to the respective node 121, 123, 125. In FIG. 4 the propagation delay for the message from the source node 102 is t140, t240, t340 for the respective node 121, 123, 125. However, the actual determination of the length of the waiting time, and consequently the timer, is outside the scope of the present disclosure.

The timer in the relay node 125 expires after waiting time wt125 at time t4 and the relay node 125 then transmits the message 300 with an altered header as described above. The fact that the message has been altered is indicated in that the reference numeral for the message is 300'. The timer in node 123 expires after waiting time wt123, at time t7, and the timer in node 121 expires after waiting time wt121, at time t8. As illustrated in FIG. 4, time t4 is well before both times t7 and t8 and, consequently, the relay node 125 transmits the message 300' at time t4.

FIG. 4 also illustrates the effect of the method of the present disclosure from the perspective of nodes 121 and 123. Node 123 starts the timer at time t2 using waiting time wt123, upon reception of the message 300. At time t5, while the timer is running, the node 123 determines that the message is transmitted by the relay node 125 and, as a consequence of this determination, refrains from transmitting the message. As described above, the determination that the message is transmitted by the relay node 125 is realized in that the node 123 listens for transmissions and receives the message 300', e.g. having an altered header, transmitted by the relay node 125.

Similarly, from the perspective of node 121, node 121 starts the timer at time t1 using waiting time wt121, upon reception of the message 300. At time t6, while the timer is running, the node 121 determines that the message is transmitted by the relay node 125 and, as a consequence of this determination, refrains from transmitting the message. As described above, the determination that the message is transmitted by the relay node 125 is realized in that the node 121 listens for transmissions and receives the message 300', e.g. having an altered header, transmitted by the relay node 125.

Although not illustrated in FIG. 4, in case the message 300 is an ACK or NACK, the terminology of source/destination gets reversed but the handling of ACK/NACK messages will follow the procedure as described above.

The embodiments described above illustrate that far reaching messages will use their full reach whereas not so far reaching messages will still be forwarded, hence avoiding time consuming retransmissions. For example the waiting time of the relay node may be such that, in case it is spatially closer to the destination node 104 than another node in the node subset 120, it is shorter than a waiting time in that other node. Conversely, in case the relay node is spatially further away from the destination node 104 than that other node in the node subset 120, then the waiting time of the relay node may be longer than the waiting time in that other node. Hence, when the waiting time of the relay node and the nodes in the node subset 120 are related as discussed above, among all nodes receiving the message 300, the node spatially closest to the destination node 104 will start transmitting the message 300' first. Other nodes in the node subset 120 that have also received the message 300 but whose timer has not expired before the message 300' is transmitted by another node may cancel their own transmission and, e.g., discard the received message 300.

The waiting time may in other examples, instead of having a distance to destination relation, be associated with inherent node delays, such as processing delays and delays associated with node-to-node links.

However, irrespective of which association or relation exists for the waiting time, it should be pointed out that the waiting time is short in relation to any processing time needed for handling the message 300 in the relay node, which means that an overall latency associated with the relaying of the message 300 from the source node 102 to the destination node 104 is only marginally affected by the waiting time.

Figure 5:
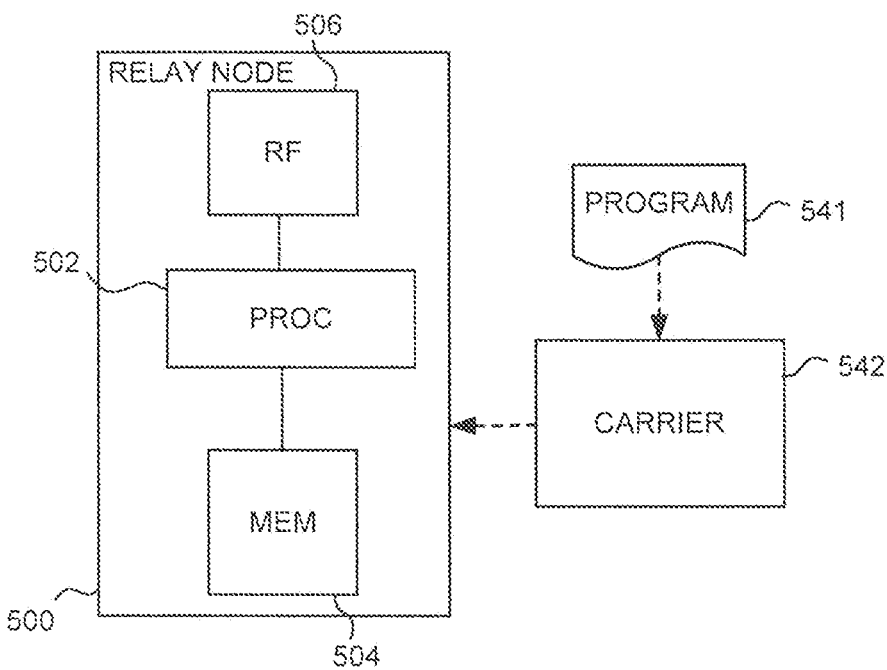
FIG. 5 schematically illustrates a block diagram of a relay node.

Turning now to FIG. 5, a relay node 500 will be described in some more detail. For example, the relay node 500 may be any of the nodes 121, 123, 125 discussed above in connection with FIGS. 1 to 4. The relay node 500 is for use in a mesh network, such as the mesh network 100, for handling relay of messages between a source node, e.g. node 102, and a destination node, e.g. node 104, where the mesh network comprises a plurality of other nodes. The relay node 500 comprises radio frequency control circuitry 506, a processor 502 and a memory 504. The memory 504 contains instructions executable by the processor 502 whereby the relay node 500 is operative to:

receive a message, e.g. message 300, comprising a header 302 that comprises an address 304 of the destination node and an address 306 representing a node subset 120 comprising the relay node and at least one other node, start a timer, determine, while the timer is running, whether any other node in the node subset transmits the message and, if it is determined that none of the other nodes in the node subset transmits the message, then:

alter at least a part of the message header of the message, and transmit the message.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the relay node 500 is operative such that the determination whether any other node in the node subset transmits the message comprises:

determining whether any other node in the node subset transmits the message having an altered header.

In some embodiments, the relay node 500 is operative such that the header comprises an address 308 of a transmitting node and operative such that the determination whether any other node in the node subset transmits the message having an altered header comprises:

determining whether the address of the transmitting node is altered.

In some embodiments, the relay node 500 is operative such that the header comprises an address 308 of a transmitting node and operative such that the altering of at least a part of the message header comprises:

altering the address of the transmitting node in the header to an address of the relay node itself.

In some embodiments, the relay node 500 is operative to: receive, prior to the reception of the message, information that represents the timer value.

In some embodiments, the relay node 500 is operative to: receive, prior to the reception of the message, information that represents the address representing the node subset.

In some embodiments, the relay node 500 is operative to: receive any of:

the information that represents the timer value and the information that represents the address representing the node subset in a path reply, PREP, message.

Figure 6:
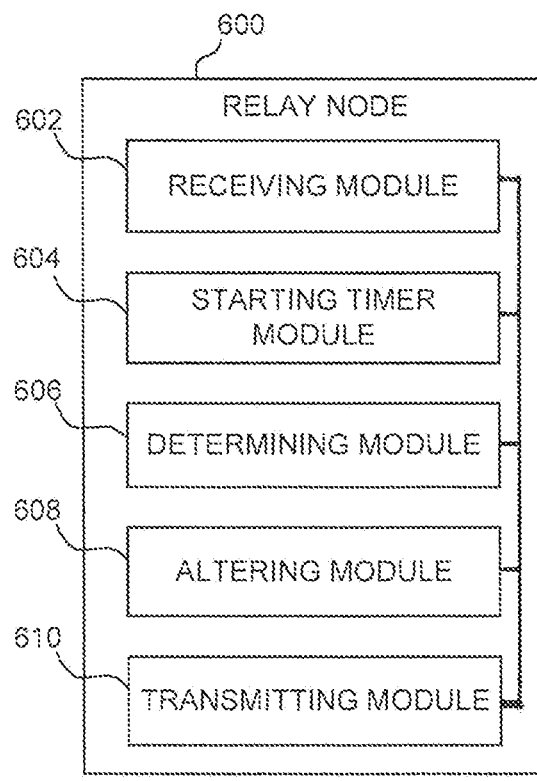
FIG. 6 schematically illustrates a block diagram of a relay node.

Turning now to FIG. 6, a relay node 600 will be described in some more detail. For example, the relay node 600 may be any of the nodes 121, 123, 125 discussed above in connection with FIGS. 1 to 4. The relay node 600 is for use in a mesh network, such as the mesh network 100, for handling relay of messages between a source node, e.g. node 102, and a destination node, e.g. node 104, where the mesh network comprises a plurality of other nodes. The relay node 600 comprises:

a receiving module 602 configured to receive a message, e.g. message 300, comprising a header 302 that comprises an address 304 of the destination node and an address 306 representing a node subset 120 comprising the relay node and at least one other node, a starting timer module 604 configured to start a timer, a determining module 606 configured to determine, while the timer is running, whether any other node in the node subset transmits the message and, if it is determined that none of the other nodes in the node subset transmits the message, then:

an altering module 608 configured to alter at least a part of the message header of the message, and a transmitting module 610 configured to transmit the message.

The relay node 600 may comprise further modules that are configured to perform in a similar manner as, e.g., the relay node 500 described above in connection with FIG. 5.

As used herein, the term "processing module" may refer to a processing circuit, a processing unit, a processor, an Application Specific integrated Circuit, ASIC, a Field-Programmable Gate Array, FPGA, or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory, RAM, or the like. Furthermore, the term "memory" may refer to an internal register memory of a processor or the like.

As used herein, the term "computer readable medium" may be a Universal Serial Bus, USB, memory, a DVD-disc, a Blu-ray disc, a software module that is received as a stream of data, a Flash memory, a hard drive, a memory card, such as a MemoryStick, a Multimedia Card, MMC, etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, in a relay node in a mesh network, for handling relay of messages between a source node and a destination node, where the mesh network comprises a plurality of other nodes, the method comprising:
receiving a message comprising a header, the header comprising an address of the destination node and an address representing a node subset comprising the relay node and at least one other node;
starting a timer,
determining, while the timer is running, whether any of the at least one other node in the node subset transmits the message; and, in response to determining that none of the at least one other node in the node subset transmits the message, then:
altering at least a part of the message header of the message; and
transmitting the message.

2. The method of claim 1, wherein the determining whether any of the at least one other node in the node subset transmits the message comprises determining whether any of the at least one other node in the node subset transmits the message having an altered header.

3. The method of claim 2, wherein:
the header comprises an address of a transmitting node;
the determining whether any of the at least one other node in the node subset transmits the message having an altered header comprises determining whether the address of the transmitting node is altered.

4. The method of claim 1, wherein:
the header comprises an address of a transmitting node; and
the altering of at least a part of the message header comprises altering the address of the transmitting node in the header to an address of the relay node itself.

5. The method of claim 1, further comprising receiving, prior to the reception of the message, information that represents a value of the timer.

6. The method of claim 1, further comprising receiving, prior to the reception of the message, information that represents the address representing the node subset.

7. The method of claim 1, further comprising receiving first information that represents a value of the timer, second information that represents the address representing the node subset in a path reply (PREP) message, or both.

8. A relay node for use in a mesh network for handling relay of messages between a source node and a destination node, where the mesh network comprises a plurality of other nodes, the relay node comprising:
radio frequency control circuitry;
a processor;
memory containing instructions executable by the processor that, when executed by the processor, cause the relay node to be operative to:
receive a message comprising a header, the header comprising an address of the destination node and an address representing a node subset comprising the relay node and at least one other node;
start a timer,
determine, while the timer is running, whether any of the at least one other node in the node subset transmits the message and, in response to determining that none of the at least one other node in the node subset transmits the message, then:
alter at least a part of the message header of the message; and
transmit the message.

9. The relay node of claim 8, wherein determining whether any of the at least one other node in the node subset transmits the message comprises determining whether any of the at least one other node in the node subset transmits the message having an altered header.

10. The relay node of claim 9, wherein:
the header comprises an address of a transmitting node;
the determining whether any of the at least one other node in the node subset transmits the message having an altered header comprises determining whether the address of the transmitting node is altered.

11. The relay node of claim 8, wherein:
the header comprises an address of a transmitting node;
the altering of at least a part of the message header comprises altering the address of the transmitting node in the header to an address of the relay node itself.

12. The relay node of claim 8, wherein the instructions, when executed by the processor, cause the relay node to be operative to receive, prior to the reception of the message, information that represents a value of the timer.

13. The relay node of claim 12, wherein the instructions, when executed by the processor, cause the relay node to be operative to receive any of:
the information that represents the value of the timer;
information that represents the address representing the node subset in a path reply (PREP) message.

14. The relay node of claim 8, wherein the instructions, when executed by the processor, cause the relay node to be operative to receive, prior to the reception of the message, information that represents the address representing the node subset.

15. A computer program product stored in a non-transitory computer readable medium for controlling a relay node in a mesh network, and for handling relay of messages between a source node and a destination node, where the mesh network comprises a plurality of other nodes, the computer program product comprising software instructions which, when run on one or more processors of the relay node, causes the relay node to:
receive a message comprising a header, the header comprising an address of the destination node and an address representing a node subset comprising the relay node and at least one other node;
start a timer,
determine, while the timer is running, whether any of the at least one other node in the node subset transmits the message; and, in response to determining that none of the of the at least one other node in the node subset transmits the message, then:
alter at least a part of the message header of the message; and
transmit the message.

\* \* \* \* \*